United States Patent [19]

Hsu

[11] 3,745,659

[45] July 17, 1973

[54] WATER-IN-OIL DETECTOR

[76] Inventor: Charles Jui-Cheng Hsu, P.O. Box 466, Grand Central Station, New York, N.Y. 10017

[22] Filed: Nov. 4, 1971

[21] Appl. No.: 195,550

[52] U.S. Cl. ............................................ 33/126.7 R
[51] Int. Cl. ............................................ G01f 23/04
[58] Field of Search ...................... 33/126, 126.4 R, 33/126.4 A, 126.7

[56] References Cited
UNITED STATES PATENTS 1,947,592   2/1934   Haller .................. 33/126.4 R X
3,091,037   5/1963   Pelletier .................. 33/126.4 R Primary Examiner—Louis R. Prince
Assistant Examiner—Charles E. Phillips

[57] ABSTRACT

A gauge device designed particularly to indicate the presence of water at the bottom of a storage tank used for various types of oils, the device consisting of a porous enclosure such as a sack made of woven fabric material, and which contains Sterculia lynchnophora Hance powder that is expandable in water but which is not affected by oil, the gauge being lowered to the tank bottom on a tethered line where it is retained a while for reaction with any present water and then pulled up for inspection.

1 Claim, 6 Drawing Figures

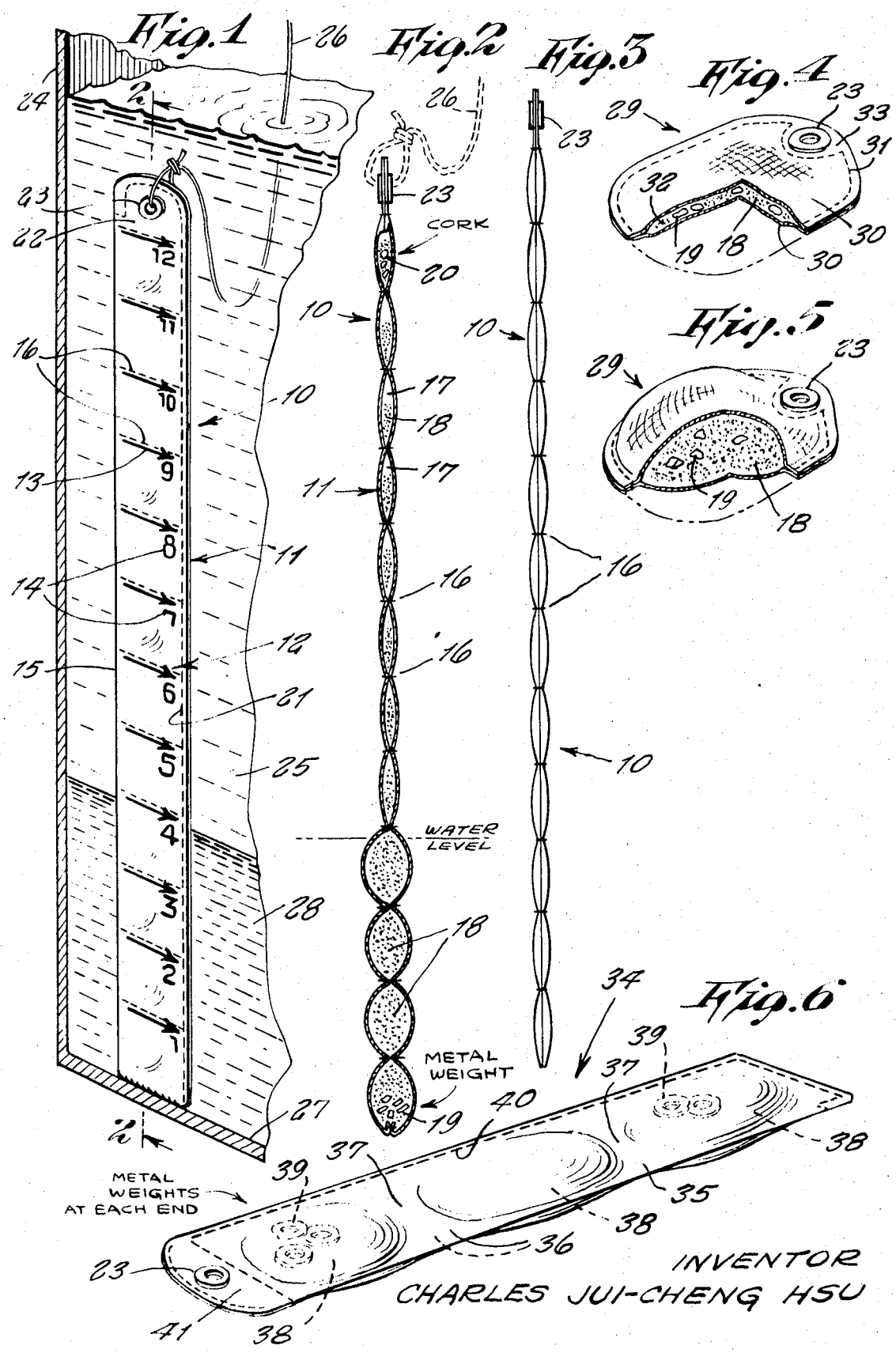

WATER-IN-OIL DETECTOR

This invention relates generally to gauges. More specifically it relates to oil tank gauges.

A principal object of the present invention is to provide a gauge for detecting the presence of water in a bottom of an oil tank containing oil.

Another object is to provide a gauge which in one form of the invention indicates a depth of the water in a bottom of an oil tank, and below the oil contained in the tank.

Still another object is to provide a gauge which in another form of the invention will serve to blot up the water so to remove it from the tank, when the gauge is pulled up.

Still another object is to provide a gauge which is affected only by water and not by oil so that it can be used in storage tanks holding various types of oils, such as gasoline, petroleum, fuel oil, cooking oils, and numerous other types of oily liquids that do not mix with water.

Still another object is to provide a gauge which accordingly is particularly adaptable for use in oil storage tanks that are not fitted with the water detection gauges such as the sophisticated large storage tanks used in industries like the petroleum cracking industry; and which would be therefore ideal for the numerous other oil storage tanks now used, such as the fuel oil tanks for an average home, apartment house or office building.

Yet a further object is to provide a detector gauge which permits checking for water in an oil tank without need to remove the oil from the tank.

Other objects are to provide a water-in-oil detector which is simple in design, inexpensive to manufacture, rugged in construction, easy to use and efficient in operation.

These and other objects will be readily apparent upon a study of the following specification and the accompanying drawing, wherein:

FIG. 1 is a perspective view of one form of the invention which in addition to indicating the presence of water also indicates the depth of the water under the oil; the device being shown in use.

FIG. 2 is a side cross sectional view thereof taken on line 2—2 of FIG. 1, and showing the detector registering the water depth under the oil.

FIG. 3 is a side edge view of the detector illustrated in FIGS. 1 and 2, and shown prior to use.

FIG. 4 is a cross sectional perspective view of a modified form of the invention used to detect a shallow water under the oil and additionally used to blot it up; the detector being shown prior to use.

FIG. 5 is a similar view thereof shown after use.

FIG. 6 is a perspective view of another modified model of the invention which is generally similar in purpose to the detector illustrated in FIGS. 4 and 5, except that the present model is for a larger water volume use.

Referring now to the drawing in detail, and more particularly at this time to FIGS. 1 to 3 thereof, the reference numeral 10 represents a water-in-oil detector according to the present invention wherein there is an enveloping enclosure 11 made of a woven fabric material so that it is porous. The fabric material is in the pattern of a long strip of more than twelve inches in length and approximately 2 inches in width. A linear twelve inch scale 12 is imprinted along one side, the scale concluding calibrations 13 each of which is identified by an inch numeral 14. The fabric material is folded over a central longitudinal fold line 15, and a series of transverse, parallel, spaced apart stitches 16 are made through the folded fabric, each stitch being made along a calibration 13 so as to form separate pockets 17 between the inch calibrations. Into each pocket an equal measured quantity of Sterculia lynchnophora Hance powder 18 is added. This is a plant which, when dried and pulverized, has the property of being expandable to over fifteen times in water. A feature of the present invention is that this powder is first pre-soaked in water, then dried, and then broken up so that the resultant powder is four times faster in its water absorption, due to the pre-soaking step in its manufacture.

In an endmost pocket adjacent the one inch calibration numeral, there are additionally placed several lead weights 19, while in an opposite endmost pocket adjacent the twelve inch calibration numeral there are additionally placed several pieces of cork 20. The pockets are then sewn closed by a longitudinal edge stitch 21 that extends around a tab 22 formed on the end adjacent the twelve inch calibration. A grommet 23 is fitted through the tab.

In operative use, in order to check for the existence and a quantity of water in an oil tank 24 containing oil 25, a string 26 is tethered to the grommet 23 and the detector is lowered into the tank, until the weighed end of the detector comes to rest upon the tank bottom 27. The cork 20 at the opposite end maintains the detector to float vertically straight up, as shown in FIG. 1, so that it forms a vertical scale measuring upwardly from the tank bottom wall. The detector is allowed to remain in the tank sufficiently long so that any water 28 at the tank bottom can react with the powder 18, thus causing the powder, in the lowermost pockets contacting the water, to swell up, as is shown in FIG. 2. Thus in the example illustrated in FIGS. 1 and 2, when the detector is pulled out of the tank, the swelled lower pockets indicate the presence of water under the oil, the water being to a depth of between 3 to 4 inches. The pocket contacting only the oil is not swelled because the powder is not affected by the oil.

In lowering the detector through the oil, the powder in all the pockets contacts the oil, however tests have proven that such powder thus coated with the oil is nevertheless still affected by the water thereafter.

Referring now to FIGS. 4 and 5 of the drawing, a modified design of detector 29 is shown that is used only for detecting the presence of water in a tank bottom and then blotting it up; and which therefore is particularly designed for use in tanks where such water is minimal along the bottom and not deep. The detector simply comprises two panels 30 of woven porous fabric with a peripheral stitch 31 to form a central pocket 32 containing powder 18 and lead weights 19. A grommet 23 in an end tab 33 serves for attachment to a string. As shown in FIG. 5, the bulging pocket shows the water swollen powder after use.

In FIG. 6 a slightly modified form of the above described detector 29 is shown comprising a detector 34 which is for identical purpose but which is larger in size for use either in larger tanks or where there may be a larger water accumulation. The detector 34 comprises folded over porous, woven fabric 35 to form upper and lower panels 36 having transverse separating partitions 37 of water soluble adhesive so to form pockets 38 therebetween filled with powder 18; the endmost pockets having additional weight washers 39 stitched therein, so to maintain the detector in a horizontal position when in use. The pockets are closed by a peripheral stitch 40 and a grommet 23 secured to end tab 41. In operative use, the partitions 37 may dissolve in the water so that a single large pocket is thus formed for allowing the powder a space for maximum water absorption.

Thus there is provided a novel water-in-oil detector, in which a pre-soaked powder improves the water absorption up to four times faster. In lowering the detector through the oil to the bottom of the tank, the oil will coat the powder and somewhat retard the speed of its water absorption, this retardation amount depending on the viscosity of the oil. Accordingly, in some situations the detector should be allowed in the tank up to two hours for a reading.

While various changes may be made in the detail construction, it is understood that such changes will be within the spirit and scope of the present invention as is defined by the appended claims.

I claim:
1. In a water-in-oil detector for detecting the presence of water in the bottom of an oil tank, the combination of a sack of woven mesh fabric which is partly filled with Sterculia lynchnophora Hance powder, lead weights in said sack for retaining said detector at the bottom of an oil tank, a grommeted opening for attachment to a tethering line, said powder having the property of being first pre-soaked in water, after which it is thoroughly dried, and then broken up prior to placement in said sack, wherein when said detector is used to measure a water depth, said sack being of elongated character and having a row of separate pockets each of which is partly filled with said powder, a linear scale imprinted along an outer side of said sack, one endmost pocket having said lead weights therein, and an opposite endmost pocket having cork placed therein so that said detector floats vertically upright from said tank bottom.

* * * * *